US008855479B2

(12) United States Patent
Yasuda

(10) Patent No.: US 8,855,479 B2
(45) Date of Patent: Oct. 7, 2014

(54) IMAGING APPARATUS AND METHOD FOR CONTROLLING SAME

(75) Inventor: Hitoshi Yasuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 13/095,113

(22) Filed: Apr. 27, 2011

(65) Prior Publication Data

US 2011/0274420 A1 Nov. 10, 2011

(30) Foreign Application Priority Data

May 10, 2010 (JP) ................................. 2010-108599

(51) Int. Cl.
G03B 13/00 (2006.01)
G03B 3/10 (2006.01)
H04N 5/232 (2006.01)
G02B 7/36 (2006.01)
H04N 5/369 (2011.01)
G03B 13/36 (2006.01)

(52) U.S. Cl.
CPC ............ G03B 13/36 (2013.01); H04N 5/23212 (2013.01); G02B 7/36 (2013.01); H04N 5/3696 (2013.01)
USPC ............................ 396/104; 396/132; 396/125

(58) Field of Classification Search
USPC ......... 396/104, 111, 113, 114, 119, 125, 127, 396/128; 348/345
See application file for complete search history.

(56) References Cited

U.S. PATENT DOCUMENTS 6,157,782 A * 12/2000 Aoyama ........................ 396/104
2008/0025713 A1* 1/2008 Yasuda .......................... 396/104

(Continued)

FOREIGN PATENT DOCUMENTS

JP 04-204430 A 7/1992
JP 09-274129 A 10/1997

(Continued)

OTHER PUBLICATIONS

The above references were cited in a Apr. 17, 2012 Japanese Office Action, that issued in Japanese Patent Application No. 2010-108599 an English Translation of the Japanese Office Action is enclosed.

(Continued)

Primary Examiner — W B Perkey
Assistant Examiner — Minh Phan
(74) Attorney, Agent, or Firm — Cowan, Liebowitz & Latman, P.C.

(57) ABSTRACT

To provide an imaging apparatus and a method of controlling the apparatus that enables improved automatic focus adjustment performance also in relation to an image having a shallow depth of field. An imaging element 103 includes a focus state detection unit for detecting a phase difference. A camera signal processing unit 106 generates a focus adjustment signal based on the imaging signal and outputs the signal to a camera control unit 109. The camera control unit 109 acquires an in-focus lens position in accordance with a focus lens based on a focus deviation amount based on a focus state detection result, calculates distance information related to the in-focus distance on the image screen, and controls the driving of the focus lens 102 based on the distance information and the focus adjustment signal from the camera signal processing unit 106. When a difference between the in-focus lens position and the position of the focus lens at the current time exceeds a threshold, the camera control unit 109 drives the focus lens to the in-focus lens position based on the distance information. When the difference between the in-focus lens position and the focus lens position at the current time is less than or equal to the threshold, the camera control unit 109 executes the in-focus control based on the focus adjustment signal.

13 Claims, 12 Drawing Sheets

(56) References Cited

U.S. PATENT DOCUMENTS

| | | | |
|---|---|---|---|
| 2009/0115882 A1* | 5/2009 | Kawarada | 348/340 |
| 2009/0167927 A1* | 7/2009 | Kusaka | 348/345 |

FOREIGN PATENT DOCUMENTS

| | | |
|---|---|---|
| JP | 2000-292686 | 10/2000 |
| JP | 2008-129255 A | 6/2008 |
| JP | 2009-037263 A | 2/2009 |
| JP | 2009-063921 A | 3/2009 |
| JP | 2009-069577 A | 4/2009 |
| JP | 2010-020055 A | 1/2010 |

OTHER PUBLICATIONS

The above reference was cited in a Nov. 20, 2012 Japanese Office Action, that issued in Japanese Patent Application No. 2010-108599. An English Translation of the Japanese Office Action is enclosed.

* cited by examiner

Exx: LOAD LEVEL OF EACH PIXEL

☐ SELECTED IN-FOCUS DISTANCE

▦ WITHIN DEPTH

IMAGING APPARATUS AND METHOD FOR CONTROLLING SAME

BACKGROUND OF THE INVENTION

1. Field of the Invention

The present invention relates to focus adjustment control for an imaging apparatus.

2. Description of the Related Art

The introduction of single-lens reflex cameras has generated the opportunity to capture moving images with a large imaging sensor (for example, a 35 mm full-size sensor). Since a large sensor exhibits a shallow depth of field in comparison to small sensors that are used in conventional video cameras, blurring of an image may result. Therefore, in addition to in-focus areas of the image, prominent out-of-focus areas in the image are a cause of concern, and therefore there is a demand for further improvement to auto-focus adjustment.

A so-called TV-AF (autofocus) method is known as an auto-focus adjustment method during capture of moving images in which the sharpness of the imaging signal is evaluated. In this method, focus positions having the highest apparent focus are searched and extracted in order to evaluate the sharpness of the imaging signal itself. However, since the absolute defocus amount is not known, time is required to reach the in-focus point. In other words, acquisition of the in-focus point is retarded since the in-focus direction is only known from information related to the focus lens position in that time range and the difference in the level of the TV-AF signal. The focus lens must be constantly moved to compare with the level of the TV-AF signal, and therefore changes in the degree of blurring in the resultant image are emphasized particularly in objects that are removed from the depth of field.

A method has been proposed for detecting a focus state by applying a pupil division to a light flux in pixels in a portion of an imaging sensor and causing the divided light flux to become incident upon a pair of detection pixels (refer to Japanese Patent Laid-Open No. 2000-292686). Currently, progress in improved pixelation and the increasing size of imaging sensors have enabled the incorporation of focus state detection areas into a plurality of areas in the screen. In this manner, since a defocus amount of each area is discernable, the distance to an object to be imaged can be known in relation to each area in the screen. However, since the pixels in a portion of the imaging sensor are used as detection pixels, that is to say, as focus state detection elements, image data in relation to that portion must be generated by an image interpolation process, or the like. Therefore, there is a risk that the captured image will be degraded by an increased density caused by disposing a detection element on the whole effective pixel region in order to increase the focus detection accuracy.

A conventional automatic focus adjustment apparatus cannot realize an automatic focus adjustment capability that is adapted to an imaging system that has a shallow depth of field. As a result, a conspicuous change in an amount of blurring results in a TV-AF method, and when using a configuration in which a focus state detection element is incorporated into the imaging sensor, if the arrangement density of the detection elements is reduced to prevent image quality degradation, a sufficient detection accuracy is not obtained.

SUMMARY OF THE INVENTION

The present invention provides an imaging apparatus that includes an improved automatic focus adjustment also in relation to an image having a shallow depth of field, and a method for controlling the same.

In order to provide a solution to the above circumstances, the apparatus according to the present invention includes a focus state detection unit provided in an imaging element for detecting a phase difference, a signal processing unit for generating a focus adjustment signal based on the imaging signal outputted by the imaging element, and a control unit that acquires an in-focus lens position in accordance with a focus lens based on a focus deviation amount that is calculated from a detection result of the focus state detection unit to thereby calculate distance information related to the in-focus distance on the image screen, and that controls the driving of the focus lens based on the distance information and the focus adjustment signal. When the difference between the in-focus lens position and the position of the focus lens at the current time exceeds a threshold, the control unit drives the focus lens to the in-focus lens position, and when the difference between the in-focus lens position and the focus lens position at the current time is less than or equal to the threshold, the control unit executes the in-focus control based on the focus adjustment signal.

According to the present invention, improved automatic focus adjustment performance is provided also in relation to an image having a shallow depth of field by parallel application of distance information obtained from phase difference detection, and a focus adjustment signal based on an imaging signal.

Further features of the present invention will become apparent from the following description of embodiments with reference to the attached drawings.

DESCRIPTION OF THE EMBODIMENTS

First Embodiment

Figure 1:
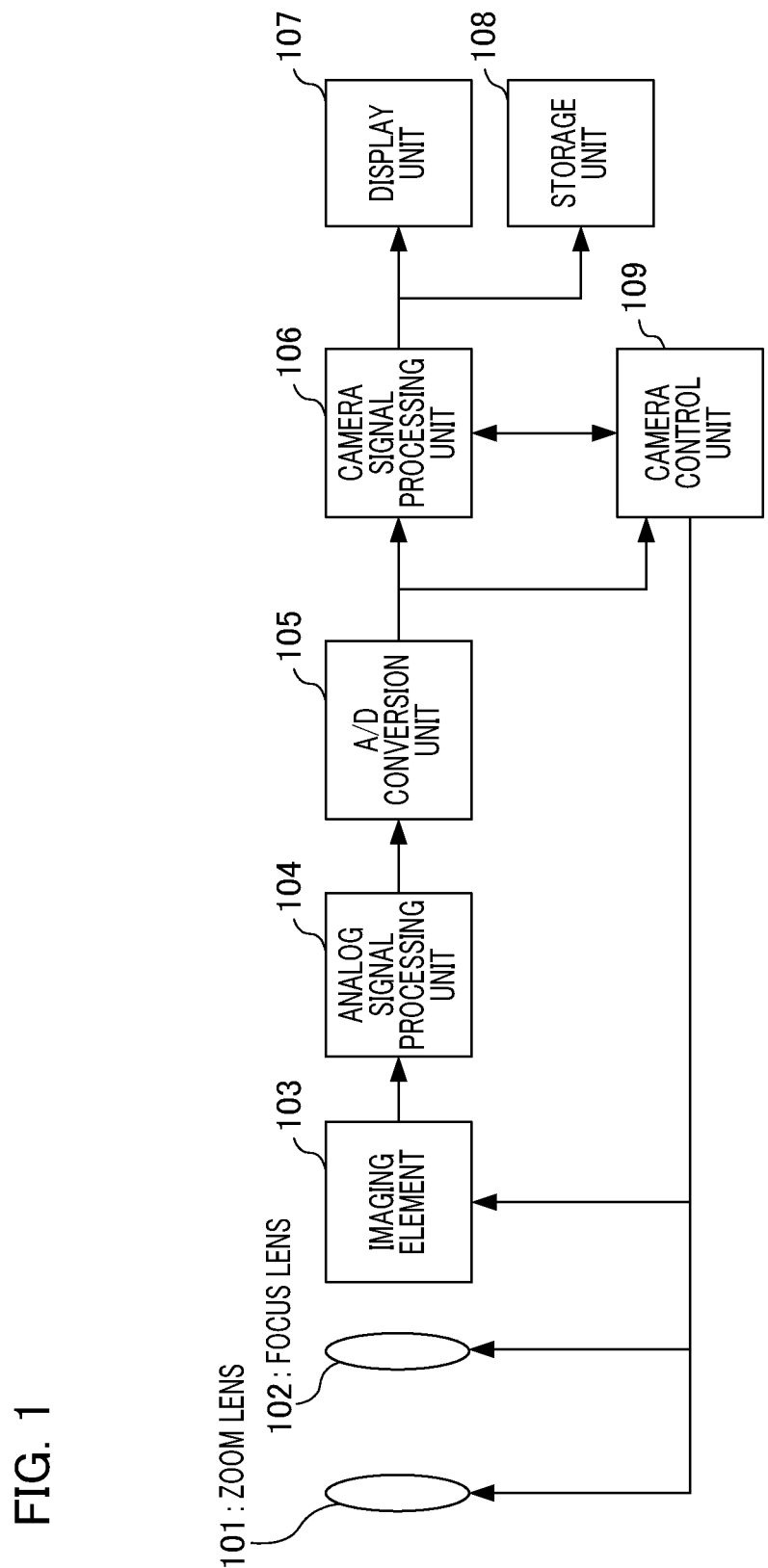
FIG. 1 illustrates an example of a configuration of an imaging apparatus according to a first embodiment of the present invention.

FIG. 1 illustrates an example of a configuration of a video camera according to a first embodiment of the present invention. In the present embodiment, although a video camera is described as an example of an imaging apparatus, the present invention may be applied to other imaging apparatuses such as digital still cameras.

The imaging optical system illustrated in FIG. 1 only illustrates a zoom lens (variable power lens) 101, and a focus lens 102. The focus lens 102 is a focus adjustment lens or lens group that includes a focusing function. An imaging element 103 is a photoelectric conversion device such as a complementary metal-oxide semiconductor (CMOS) imaging sensor or the like, and converts and outputs a light receiving signal as an electrical signal. An analog signal processing unit 104 processes an output signal of the imaging element 103 to thereby execute gain adjustment, or the like. An A/D conversion unit 105 converts the analogue signal output by the analog signal processing unit 104 to a digital signal. The camera signal processing unit 106 executes various types of image processing on the A/D converted digital signal and generates a video signal for output to a display unit 107 and a storage unit 108. The camera signal processing unit 106 includes a TV-AF signal processing circuit as described below, and generates a signal by extraction of high-frequency components from the video signal in accordance with a predetermined region in the screen, that is to say, generates a TV-AF signal. The TV-AF signal is output to the camera control unit 109.

The display unit 107 is configured by a liquid crystal display (LCD) or the like, and displays an image upon receipt of a video signal from the camera signal processing unit 106. The storage unit 108 processes the video signal from the camera signal processing unit 106 for storage in a predetermined format in a storage medium (magnetic recording medium or semiconductor memory, or the like).

The camera control unit 109 executes operational control for the whole video camera and acquires the TV-AF signal from the camera signal processing unit 106. The camera control unit 109 incorporates the pixel (focus state detection element) output used in phase difference detection by the imaging element 103 into an output signal for two images described below (image A and image B), performs a calculation for phase difference detection, and thereby acquires a focus deviation amount for each portion of the imaging area. The camera control unit 109 during AF control shifts the focus lens 102 to the in-focus lens position based on the TV-AF signal, the map information (distance map) displaying the distance distribution acquired by phase difference detection, and the in-focus position according to a distance map. The camera control unit 109 controls the driving of the zoom lens 101, the driving of the imaging element 103, and the like.

Figure 2:
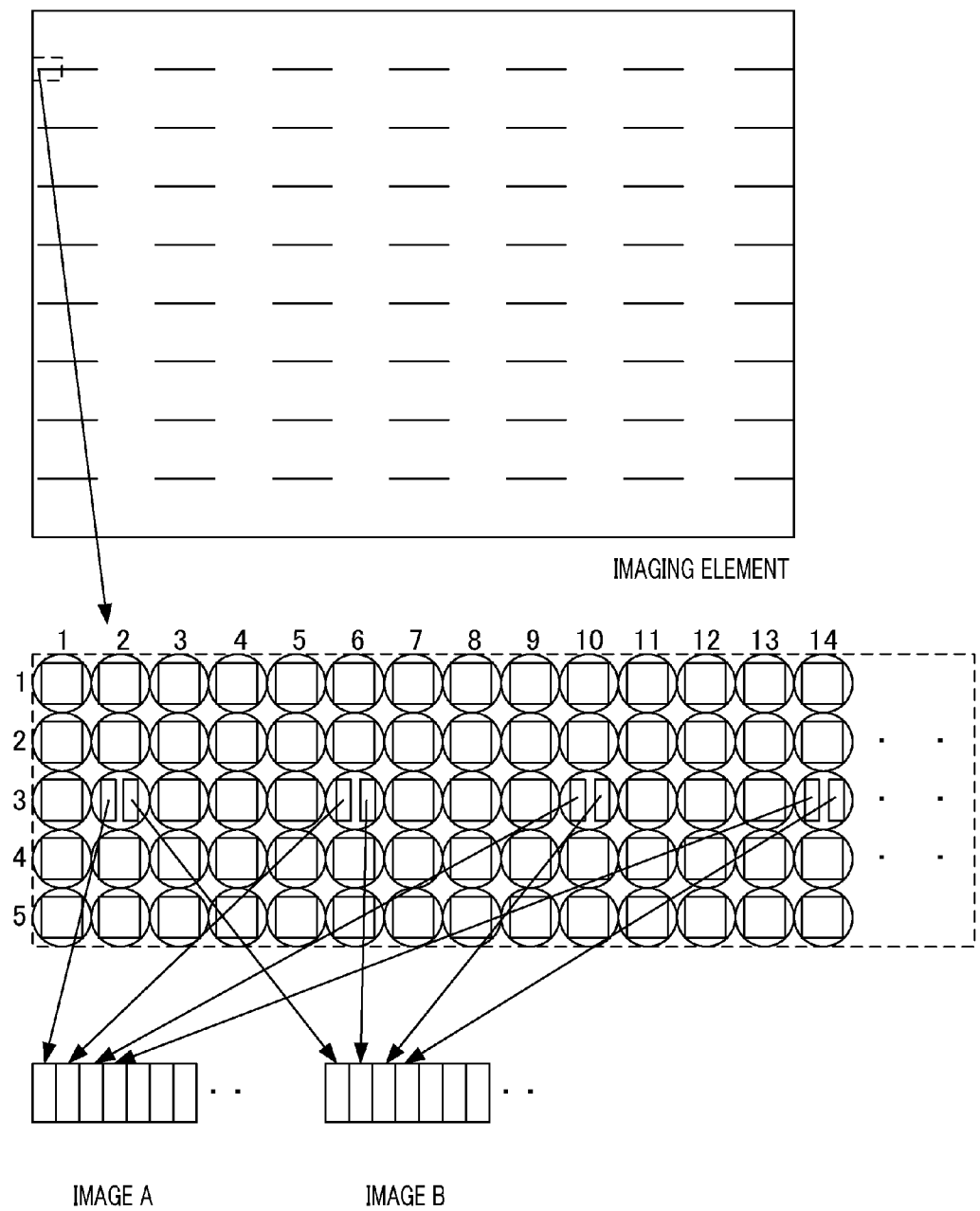
FIG. 2 illustrates an example of an imaging element that enables acquisition of distance information in addition to image information for an object.

FIG. 2 illustrates an example of the configuration of an element adapted for imaging in the imaging element 103, and a focus state detection element for phase difference detection. As illustrated in the enlarged view, the element adapted for imaging and the focus state detection element are arranged in series. In this example, elements illustrated as respective pixel columns in the first and second row, and the fourth and fifth row (indicated by the square in the round frame) are used for imaging. Detection elements for the imaging position illustrated in the second column, sixth column and tenth column . . . of the third row (the two rectangles in the round frame) are used for focus state detection. The focus state detection element exhibits improved detection accuracy when in a continuous configuration. However, since the image is subjected to a large degradation, there is a trade-off between improving accuracy and high pixelation. A microlens is disposed as illustrated by the round frame on the pre-surface of each element to execute highly efficient collection of incident light.

Figure 3A:
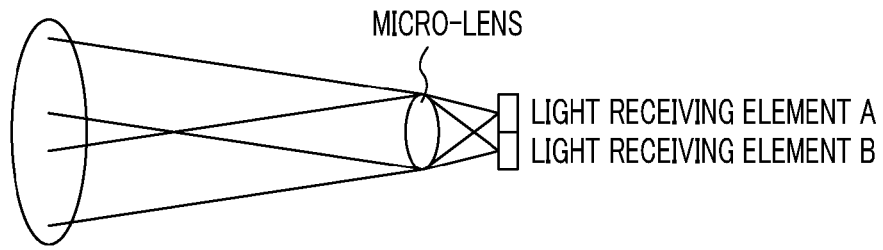
FIG. 3 illustrates a basic principle of a phase difference detection method and a pupil division method in relation to a micro-lens in the imaging element.

In the focus state detection element, each divided light flux is respectively incident upon the pair of light receiving elements A and B by subjecting the light flux to pupil division as shown in FIG. 3A. The detection result of each element is configured by combining each output of the light receiving element A (refer to the rectangles on the left side of the round frame) that is arranged in series in the horizontal direction as shown in FIG. 2 to form a first image (hereinafter referred to as "image A"). Furthermore, the output of each light receiving element B (refer to the rectangles on the right side of the round frame) is combined to form a second image (hereinafter referred to as "image B").

Figure 3B:
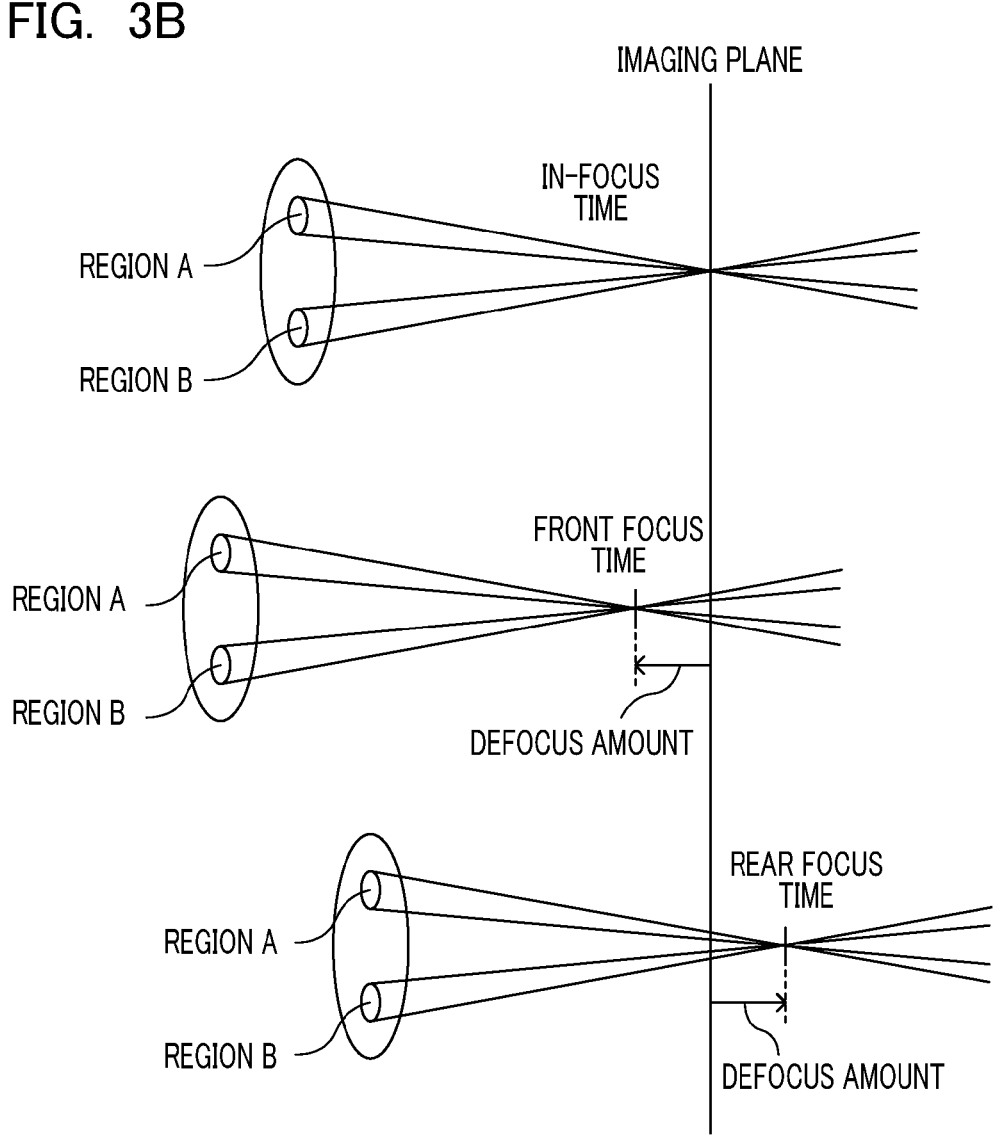

Next, the focus detection principle used to acquire a focus deviation amount for the imaging lens from image A and image B will be described. As illustrated in FIG. 3B, the position of the object image (image A) formed on the imaging plane by the light flux that passes through region A of the photographic lens and the object image (image B) formed by the light flux that passes through region B changes in response to the in-focus time, the front focus time, and the rear focus time. As the defocus amount that is the distance between the image-forming surface and the imaging plane increases, the deviation between image A and image B increases, and the reference numeral for the deviation amount is reversed during front focus and rear focus. The use of the image deviation to detect a defocus amount configures a phase difference detection method.

Next, using FIG. 4, the processing executed by the camera signal processing unit 106 (refer to reference numerals 501 to 504) and the camera control unit 109 (refer to reference numerals 506 to 512) will be described.

Figure 5:
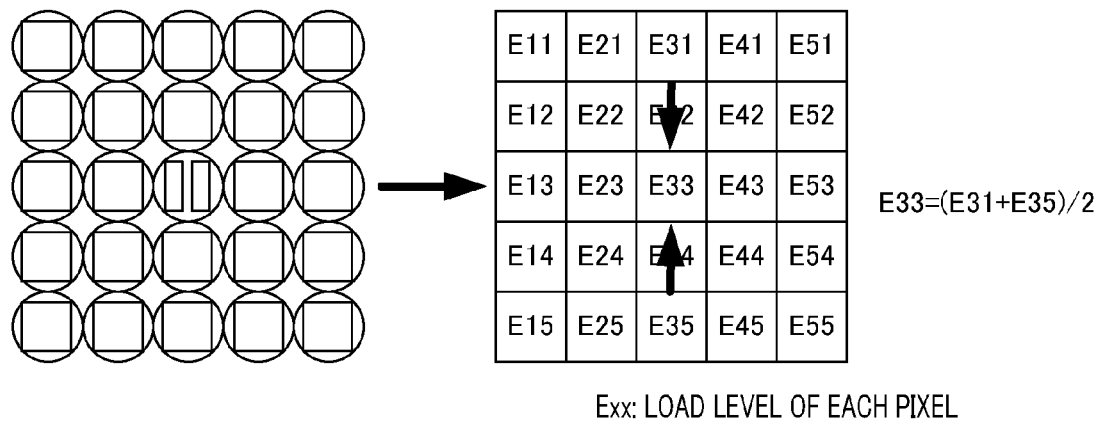
FIG. 5 illustrates an example of an interpolation processing method related to a detection element for phase difference detection.

The imaging signal read from the imaging element 103 causes a signal loss in the pixel portion corresponding to the position of the focus state detection element. For this reason, a pixel interpolation processing unit 501 calculates data corresponding to the position of the focus state detection element by interpolating using data for an image that is positioned on the periphery of the focus state detection element. The output signal of the pixel interpolation processing unit 501 is sent to the video signal processing unit 502, and is handled by the video signal processing circuit 6. This method of interpolation calculation as illustrated in FIG. 5 includes a process in which the signals from pixels having the same color, and positioned in a vertical configuration in relation to the target focus state detection element are processed using a simple average. In the present example, the focus state detection element is positioned in the center of a 5-row 5-column configuration, and "Exx" (x=1 through 5) expresses the load level for each pixel. When using a simple average method, the value E33 at the position of the focus state detection element is calculated as the average value of E31 and E35 that are positioned vertically by one pixel. In addition, a range of other methods of calculation may be used including a method of calculating a weight average value using data for the load level of a larger number of pixel that are positioned vertically and transversely with respect to a central position configured by the focus state detection element. Since this method is already known as a technique that is the same as image defect correction, detailed description thereof will be omitted.

Figure 4:
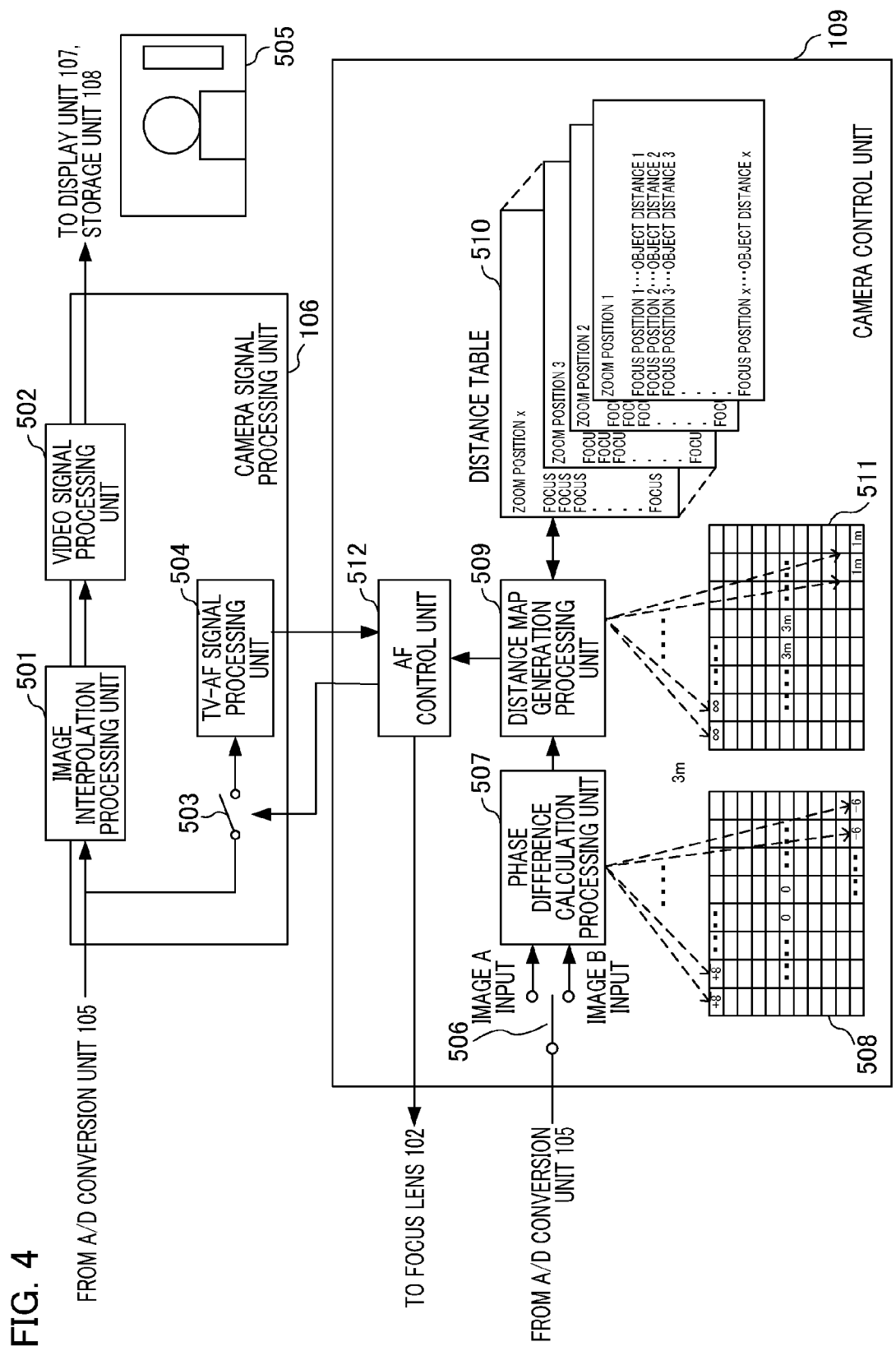
FIG. 4 illustrates an example of a configuration of a camera signal processing unit and a camera control unit to describe the first embodiment of the present invention by reference to FIG. 5 to FIG. 10.

The auto-focus (AF) gate switch 503 indicates an ON/OFF switch sign as illustrated in FIG. 4 and enables the selection of the portion of the imaging signals converted by the A/D conversion unit 105 for AF signal processing. The AF gate switch 503 is controlled according to a signal from the AF control unit 512 described below. The TV-AF signal processing unit 504 acquires a value that expresses the sharpness of the image by application of a bandpass filter or the like to a signal extracted using the AF gate switch 503 to thereby extract frequency components within a predetermined range. The video signal processing unit 502 processes the video signal to generate a signal that can be handled by the display unit 107 and the storage unit 108 in subsequent stages (refer to image data 505).

Next, the process for generating a TV-AF signal as a focus adjustment signal will be described. A TV-AF signal is generated for example by calculating the level of predetermined high-frequency components using a filtering process on the imaging signal. At this time, a distance map determines what portion of the TV-AF signal in the screen should be acquired. When a filtering process is executed on a signal that includes defective pixel portions corresponding to the position of the focus state detection element, the resulting signal will include errors. Consequently, the AF gate switch 503 controls AF signal processing in relation to a portion or portions of the video signal. In other words, in addition to determination of the AF area, the switch has the role of eliminating horizontal lines of the video signal that includes defective pixel portions corresponding to the position of the focus state detection element and which, as a result, cannot pass through TV-AF signal processing. In this manner, a TV-AF signal that is free of the effect of defective pixel portions corresponding to the position of the focus state detection element can be obtained.

A selector 506 that is denoted by the reference symbol for the switch in the camera control unit 109 allocates signals of the imaging signals subjected by A/D conversion by the A/D conversion unit 105 to the image A and the image B described above. In other words, when the selector 506 has switched to a first state, data for the image A is acquired by the phase-difference calculation processing unit 507, and when the selector 506 has switched to a second state, data for the image B is acquired by the phase-difference calculation processing unit 507. The phase-difference calculation processing unit 507 calculates the dimension of a deviation amount in the image A and the image B for each position in the image screen, and processes the deviation amount at each detection position in the form of two-dimensional array data as shown by the table 508.

A distance map generation processing unit 509 calculates an in-focus lens position based on the deviation amount calculated by the phase-difference calculation processing unit 507, and calculates an in-focus distance for each area in the image screen using the in-focus lens position and the distance table 510. The camera control unit 109 for example retains the in-focus distance data corresponding to discrete focus lens positions for each zoom lens position in the data format illustrated in the distance table 510. The distance map generation processing unit 509 uses the data in the distance table 510 to interpolate the in-focus distance corresponding to the focus lens position, and thereby generates a distance map by calculation of the distance information to the object for each focus state detection area on the imaging screen. The calculation result is managed in the form of two-dimensional array data as illustrated by the table 511.

The AF control unit 512 executes in-focus control by driving the focus lens 102 based on the data in the distance map and the TV-AF signal.

Figure 6A:
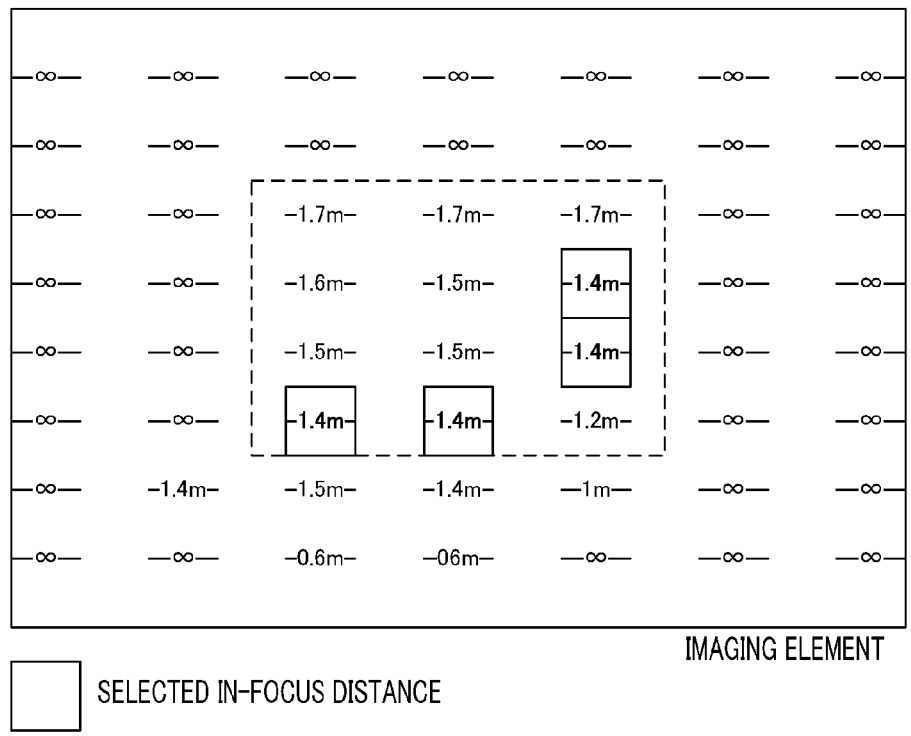
FIG. 6 illustrates an example of a detection frame and a distance map.
Figure 6B:
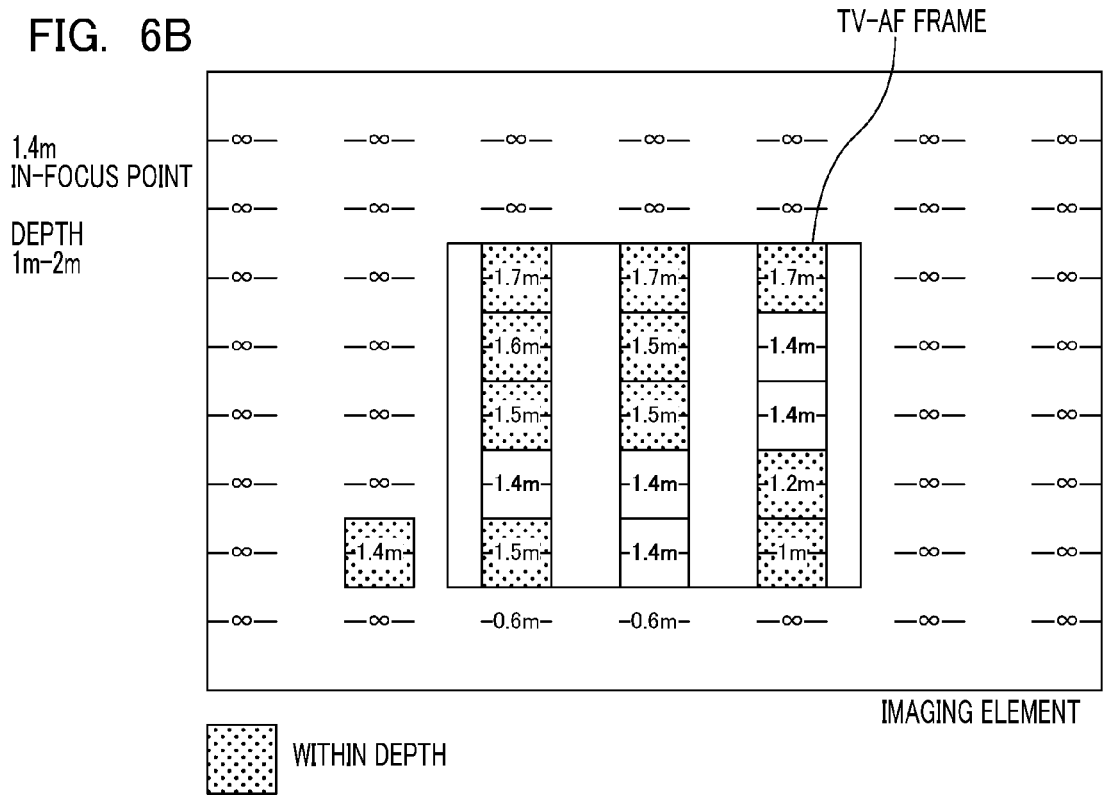

FIG. 6 illustrates an example of the distance map and the detection frame for the focus state. In the example illustrated in FIG. 6A, the most frequent distance to the proximity of the screen central portion is determined. In other words, the data element (1.4 meters) illustrated in the rectangular frame is the most frequently occurring data in the distance data illustrated in the frame enclosed by the broken line. As illustrated in FIG. 6B, an area centering on this distance from within the depth of field (in the example, the range of 1 to 2 meters) is set as the detection frame (TV-AF frame). At this time, the camera control unit 109 determines the proportion of the area that is increased by increasing the TV-AF frame and the area within the depth contained in the frame. When the proportion of the area within the depth is reduced, the frame size is set to prevent the TV-AF frame from increasing. In this manner, even when positioned is removed at a distance within the depth by a single position, an excess increase in the detection frame can be prevented.

The focus adjustment control executed by the AF control unit 512 will be described using the flowchart in FIG. 7 to FIG. 9, and FIG. 11. The processing executed during AF control is executed by programs and interpreted by the computer that configures the camera control unit 109.

Figure 7:
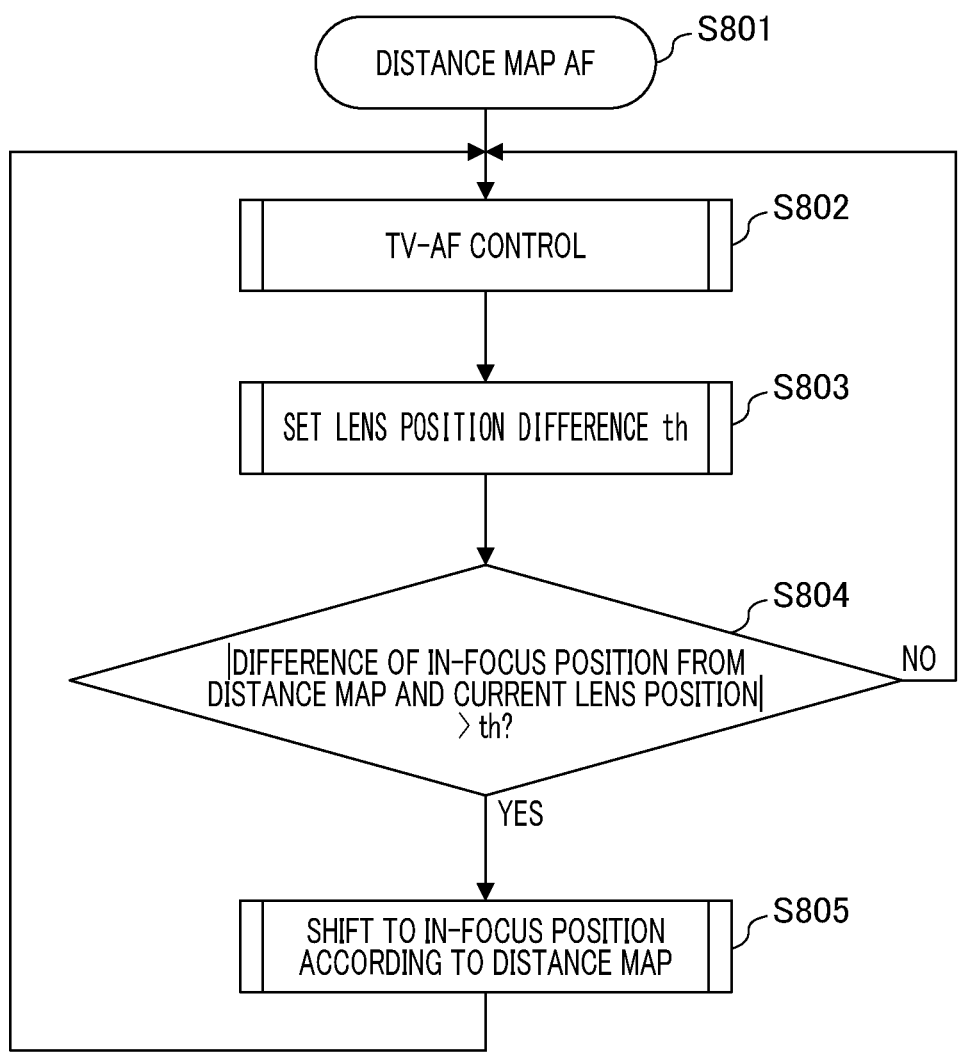
FIG. 7 is a flowchart that describes the flow of auto-focus control.

Processing is commenced in step S801 in FIG. 7 and TV-AF control is executed in step S802. The details of control will be described below using FIG. 8. Step S803 is a process of setting the lens position difference. The set value for the lens position difference (denoted as "th") is a reference value (threshold) for determining whether or not to shift the focus lens 102 to the in-focus position in accordance with the distance map when a difference is identified between the in-focus position according to the distance map and the current lens position. The camera control unit 109 in step S804 compares the difference between the in-focus position according to the distance map and the current lens position with the th value set in step S803. When the difference between the in-focus position according to the distance map and the current lens position (absolute value) is greater than the th value, the process proceeds to step S805. When the determination condition in step S804 is not satisfied, and the lens position difference is less than or equal to the threshold value, the processing returns to step S802, and processing is continued. The camera control unit 109 in step S805 executes drive control for the focus lens 102 and shifts the focus lens 102 to the in-focus position calculated with reference to the distance map.

Figure 8:
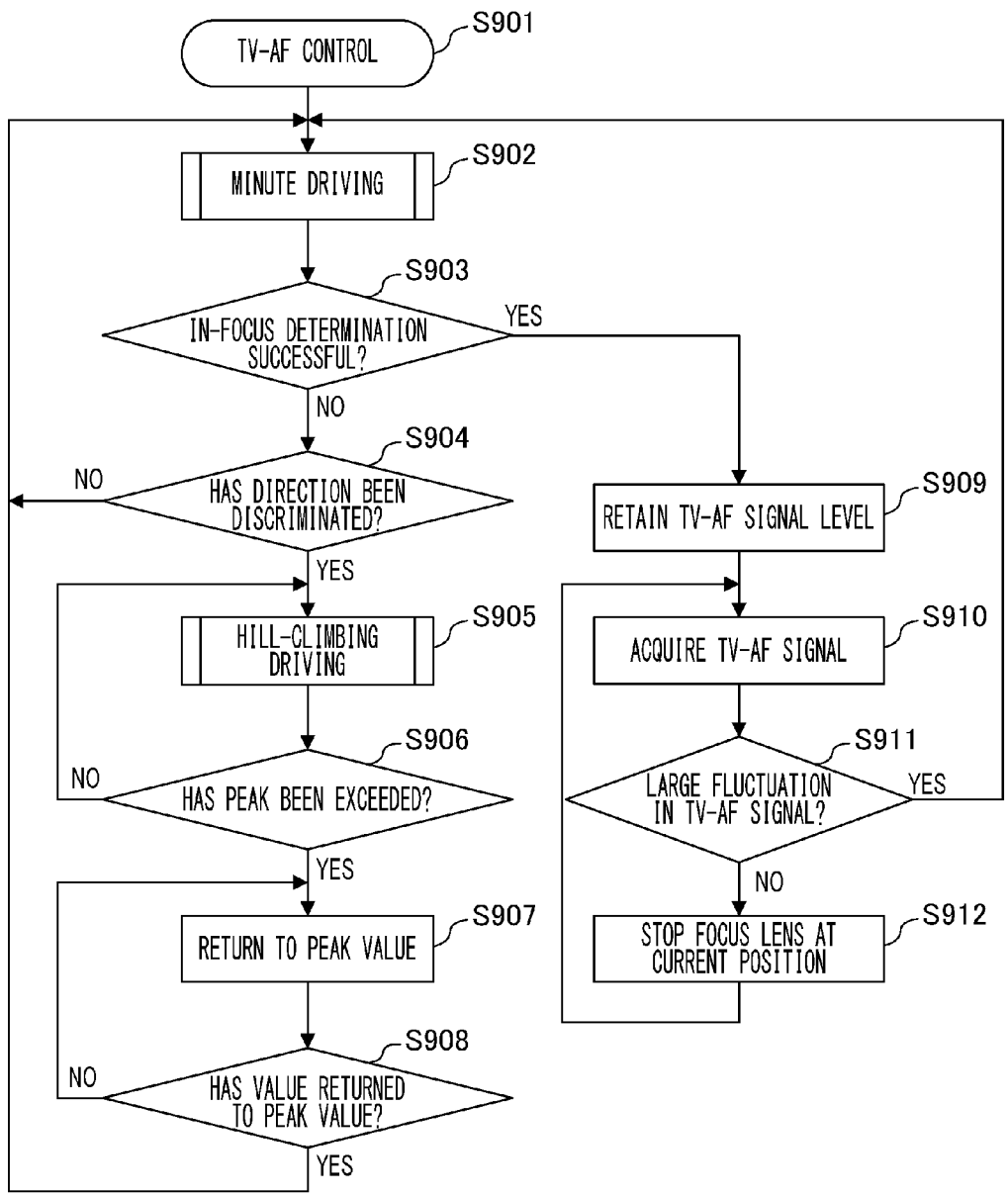
FIG. 8 is a flowchart that describes the TV-AF control in FIG. 7.

Next, the TV-AF control in step S802 above will be described with reference to the flowchart in FIG. 8. The processing is commenced in step S901, and minute driving of the focus lens 102 is executed in step S902. Minute driving is driving of the lens by searching points in proximity to the in-focus point to thereby perform an in-focus determination or discriminate the direction. The details of such driving control will be described below with reference to the flowchart in FIG. 9. The camera control unit 109 determines in-focus in step S903, and when it is determined that the apparatus is in-focus, the process proceeds to step S909. When it is determined that the apparatus is not in-focus, the process proceeds to step S904, and discrimination of a direction that coincides with in-focus is executed.

The camera control unit 109 in step S904 proceeds to step S905 when a direction is discriminated by driving the lens in step S902. However, when a direction has not been discriminated, the processing returns to step S902, and minute driving is continued. The camera control unit 109 in step S905 shifts the focus lens 102 at high speed in a direction in which the level of the TV-AF signal is increased, that is to say, hill-climbing driving is executed. The details of the driving and control process will be described below with reference to the flowchart in FIG. 11.

The camera control unit 109 in step S906 determines whether or not the level of the TV-AF signal has exceeded the corresponding peak value. When it is determined that hill-climbing driving has caused the level of the TV-AF signal to exceed the corresponding peak value, the process proceeds to step S907. When it is determined that the level of the TV-AF signal has not exceeded the corresponding peak value, the processing returns to step S905, and the camera control unit 109 continues hill-climbing driving.

The camera control unit 109 in step S907 returns the lens position of the focus lens 102 so that the level of the TV-AF signal during hill-climbing driving re-approximates the peak value. The next step S908 is a determination process of whether or not the level of the TV-AF signal exhibits a peak value. When it is determined that the position of the focus lens 102 has returned to a lens position that exhibits a peak value, the camera control unit 109 returns processing to step S902, and minute driving is executed again. Conversely, when the position of the focus lens 102 has not returned to a lens position that exhibits the peak value, processing returns processing to step S907, and the operation is continued.

Next, the in-focus operation that is executed when a determination that the configuration is in-focus is provided in step S903 will be described. After the TV-AF signal is retained in step S909, the camera control unit 109 in step S910 acquires the latest TV-AF signal. The camera control unit 109 in step S911 compares the TV-AF signal retained in step S909 with the new TV-AF signal acquired in step S910. When it is determined that the difference in the level of both signal is greater than or equal to a predetermined reference level, that is to say, when the camera control unit 109 determines that the fluctuation range of the signal is greater than or equal to a reference range, the process proceeds to step S902, and minute driving is recommenced. Conversely, when it is determined that the difference in the level of the signals in step S911 is less than the predetermined reference level, the process proceeds to step S912. In step S912, the camera control unit 109 stops the focus lens 102 at that position, and then the processing returns to step S910.

Figure 9:
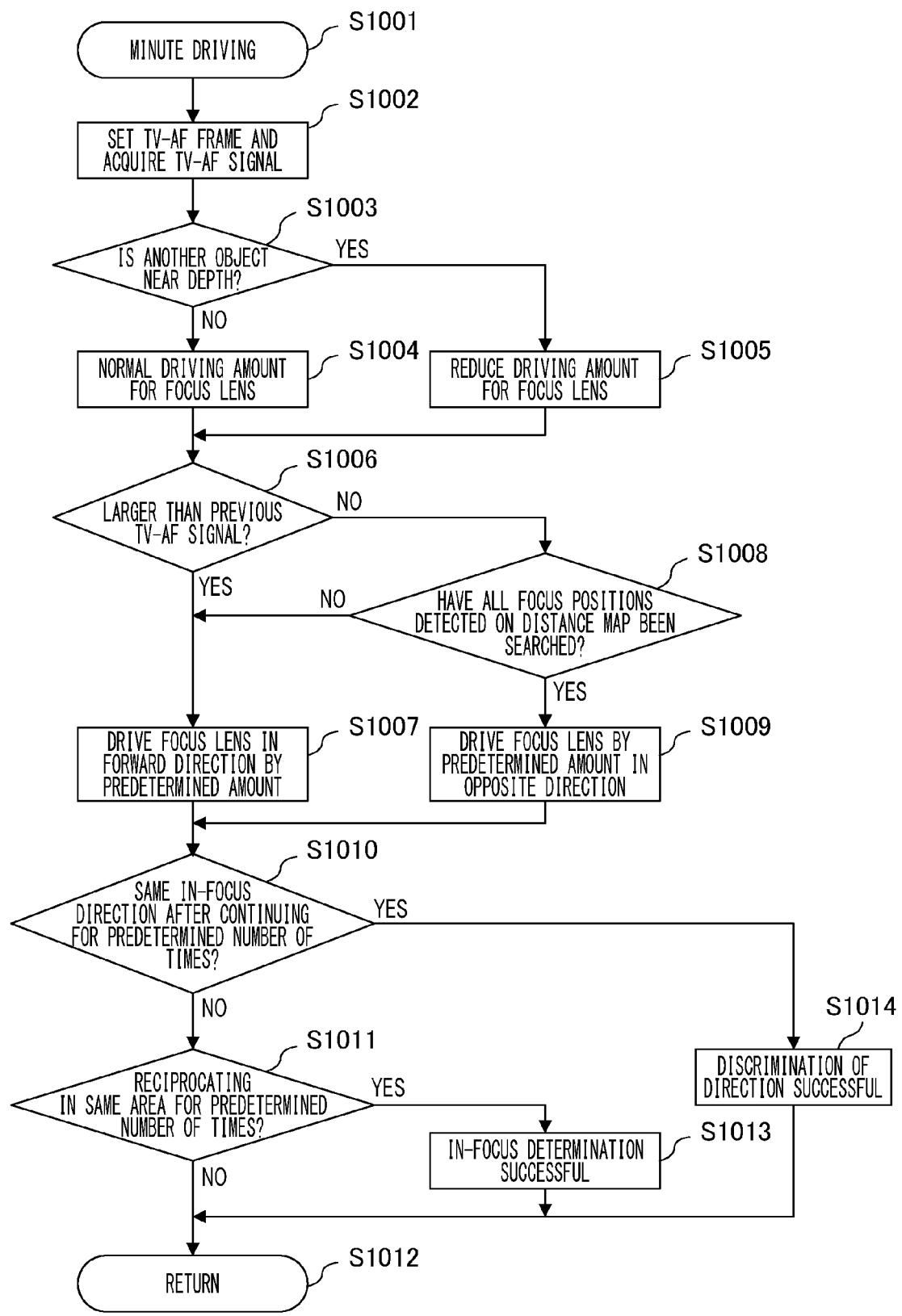
FIG. 9 is a flowchart that describes a control example related to minute driving in FIG. 8.
Figure 10A:
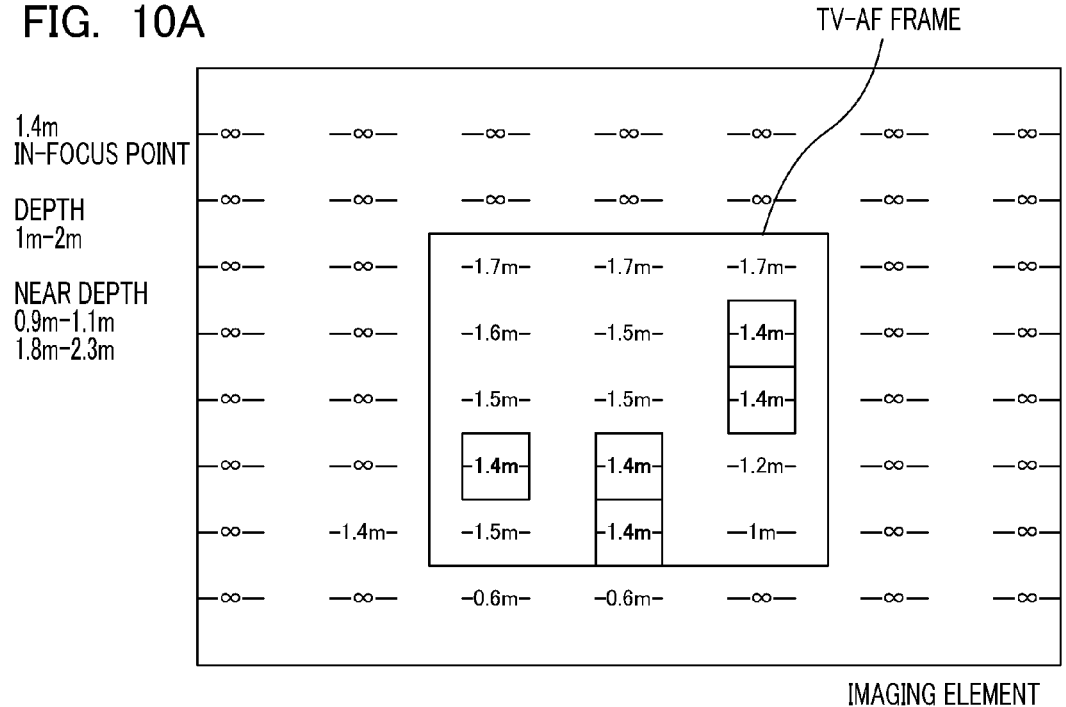
FIG. 10 illustrates an example of the detection frame and distance information.
Figure 10B:
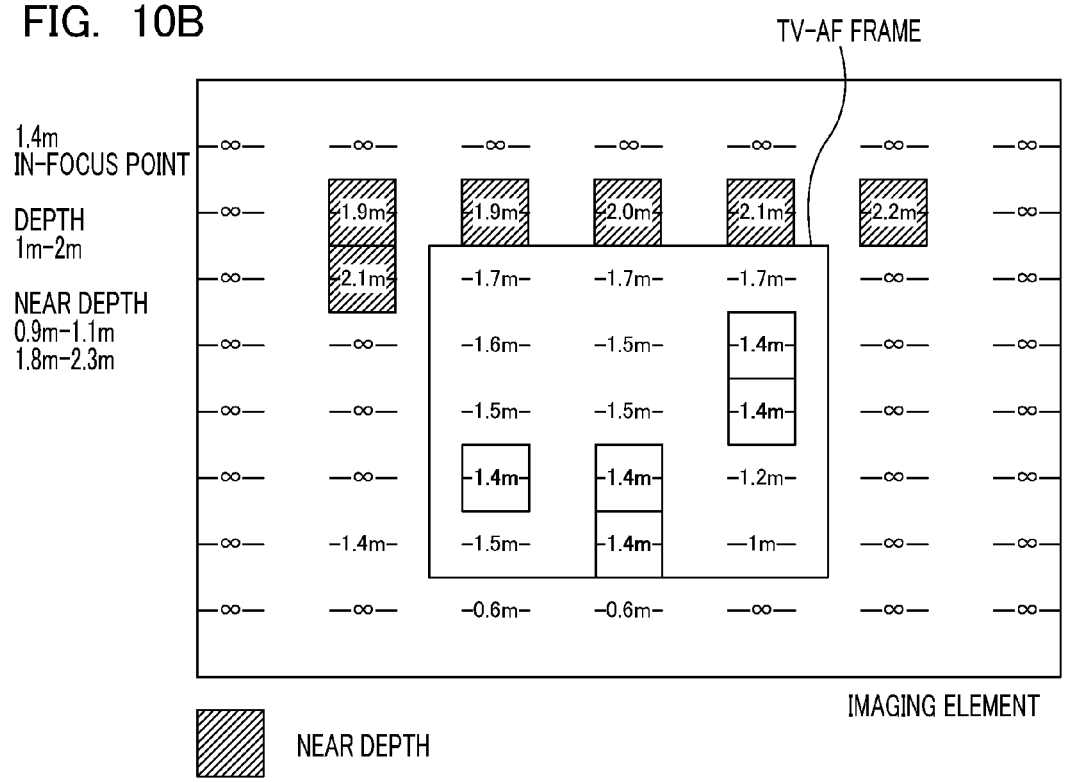

The minute driving executed in step S902 will be described next with reference to the flowchart in FIG. 9. Processing is commenced in step S1001, and in step S1002, the TV-AF frame is set to thereby execute acquisition processing for the TV-AF signal. In the setting process for the TV-AF frame, the detection frame is set based on the information for the distance map to thereby include the area defined by the in-focus distance within the depth of field (refer to FIG. 6). The camera control unit 109 in step S1003 determines whether another object is present in addition to the main object at the near-end depth based on the distance map. FIG. 10A illustrates an example of a state in which an object is not present at the near-end depth. When the depth of field is 1 to 2 meters, the indicative range for the near-end depth is from 0.9 to 1.1 meters, and 1.8 to 2.3 meters. In contrast, FIG. 10B illustrates an example when an object is present in the near-end depth (refer to the rectangular frame indicated by the sloping line). In the present example, it is determined that there is an object in a distance range of 1.9 to 2.2 meters. When it is determined that the object is present at the near-end depth, the process proceeds to step S1005. In this case, since it can be predicted that the presence of the object will cause a conspicuous change in the blurring resulting from driving of the focus lens 102, the lens driving amount per operation is changed, and a subtraction process is executed to reduce the driving amount in comparison to a predetermined amount. In this manner, the temporal variation in a blurring amount overtime can be reduced, and it is possible to improve variation in the blurring characteristics of the image. Note that the predetermined amount is a lens driving amount when another object is not present in the near-end depth as determined in the results of step S1003, and as illustrated in step S1004 described hereafter, the predetermined amount corresponds to a lens driving amount when driving the focus lens 102 in normal driving control.

The camera control unit 109 in step S1004 sets a driving amount for the focus lens 102 to the predetermined amount. The driving amount of the focus lens 102 is normally determined using a ratio relative to the focal depth, and is set to a value at which a change in focus is not evident on the screen in relation to an object which is originally in focus, even when the focus lens 102 is moved according to the predetermined amount.

After steps S1004 and S1005, the process proceeds to step S1006, and the camera control unit 109 compares the level of the TV-AF signal acquired in step S1002 with the previous TV-AF signal. When the level of the TV-AF signal acquired in step S1002 is greater than the previous TV-AF signal, the process proceeds to step S1007. When the level of the current TV-AF signal is less than the previous TV-AF signal, the process proceeds to step S1008.

The camera control unit 109 in step S1008 determines whether or not to execute minute driving so that all the in-focus distances in the depth selected by use of the distance map are included. In this manner, in addition to merely adjusting the TV-AF signal, since all the in-focus positions detected by the distance map can be searched, the camera control unit 109 can search the real in-focus point without being deceived by a false peak related to the TV-AF signal. When all in-focus positions have been searched, the process proceeds to step S1009, and when this is not the case, the process proceeds to step S1007.

The camera control unit 109 in step S1007 drives the focus lens by the predetermined amount in the same direction as the previous lens driving direction (forward direction). On the other hand, the camera control unit 109 in step S1009 drives the focus lens 102 by the predetermined amount in a direction opposite to the previous lens driving direction.

After step S1007 or step S1009, the camera control unit 109 in step S1010 determines whether the directions continuously determined as the in-focus direction over a predetermined number of times are all configured in the same direction. The predetermined number of times indicates the reference value for direction discrimination, and is set in advance. When the determined direction is the same over the predetermined number of times, the process proceeds to step S1014, and when the determined direction is not the same, the process proceeds to step S1011. The camera control unit 109 in step S1011 determines whether or not the focus lens 102 has repeated a reciprocating motion within a predetermined scope over a predetermined number of times. The predetermined number of times expresses a reference value for determination of the number of reciprocations, and is set in advance. The predetermined scope expresses the predetermined scope for calculation of the number of times reciprocating motion of the focus lens 102 is executed. When it is determined that the focus lens 102 has repeated a reciprocating motion within a predetermined scope over the predetermined number of times, the process proceeds to step S1013. When this is not the case, the process proceeds to the return processing in step S1012. When the camera control unit 109 in step S1014 determines that the direction has been discriminated, the process proceeds to step S1012. The determination result is used in step S904 in FIG. 8. Furthermore, when the camera control unit 109 in step S1013 determines that in-focus has been discriminated, the process proceeds to step S1012. The determination result is used in step S9043 in FIG. 8.

Figure 11:
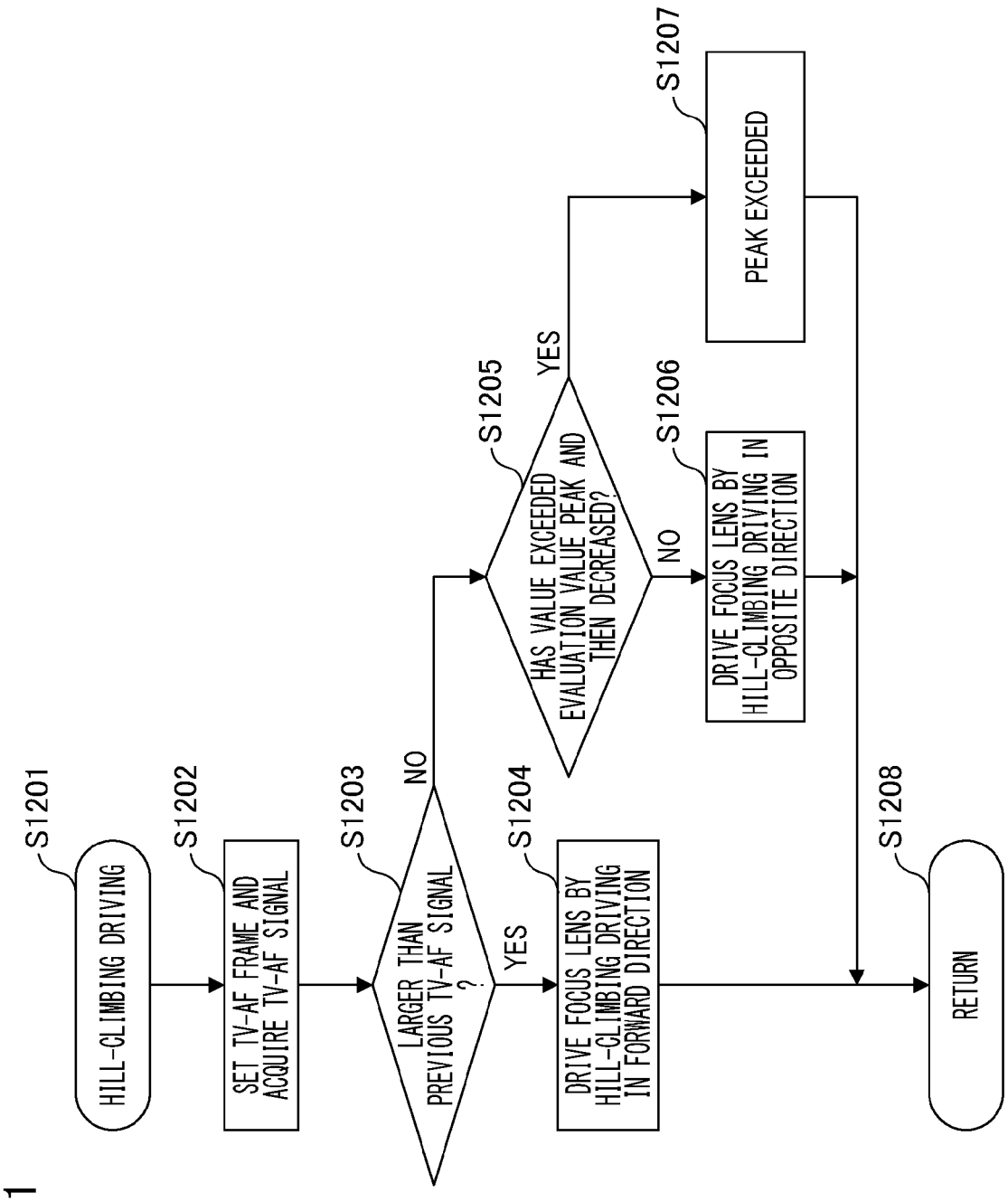
FIG. 11 is a flowchart that describes a control example related to hill-climbing driving in FIG. 8.

The hill-climbing driving shown in step S905 in FIG. 8 will be described next with reference to the flowchart in FIG. 11. The processing starts in step S1201, and the camera control unit 109 in step S1202 sets a TV-AF frame based on the distance map information to thereby acquire the TV-AF signal. The camera control unit 109 in step S1203 compares the level of the TV-AF signal acquired in step S1202 and the previous TV-AF signal. When the level of the current TV-AF signal is greater than the previous occasion, the process proceeds to step S1204. When the level of the current TV-AF signal is less than the previous occasion, the process proceeds to step S1205. The camera control unit 109 in the step S1204 drives the focus lens 102 at a predetermined speed in the forward direction as the previous lens driving direction, and then proceeds to the return processing in step S1208. On the other hand, the camera control unit 109 in step S1205 determines whether or not the level of the TV-AF signal has been reduced from a value that exceeds its peak value. When the TV-AF signal level has exhibited a peak value and then is subsequently reduced, the process proceeds to step S1207, and it is determined that the peak value was exceeded. The determination result is used in step S906 in FIG. 8. Conversely, when the TV-AF signal level in step S1205 exceeds the peak value and then is not reduced, the process proceeds to step S1206, and the camera control unit 109 drives the focus lens 102 at a predetermined speed in the direction that is opposite to the previous lens driving direction. After step S1206 and step S1207, the process proceeds to the return processing in step S1208.

According to the first embodiment, improved automatic focus adjustment performance can also be obtained in an imaging system that has a shallow depth of field by combining TV-AF control with focus adjustment control based on a distance map obtained using phase difference detection. In other words, the focus lens is driven to enable high-speed recovery from a state associated with a large amount of blurring and to thereby correctly focus to the real in-focusing point, and obtain an effect in which a conspicuous change in the amount of blurring in a background image can be suppressed.

Second Embodiment

Figure 12:
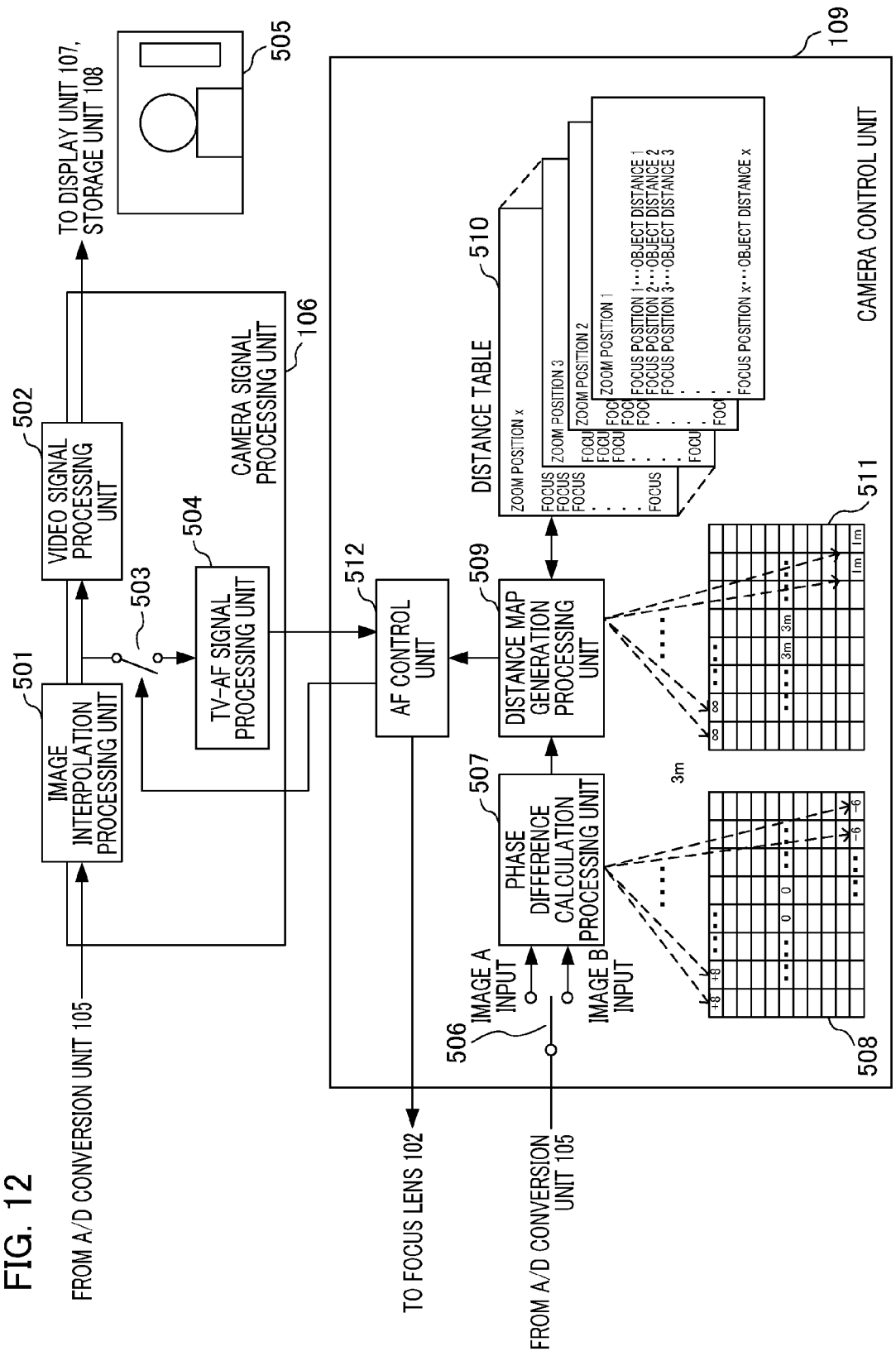
FIG. 12 illustrates an example of a configuration of a camera signal processing unit and a camera control unit according to a second embodiment of the present invention.

Next, a second embodiment of the present invention will be described. The point of difference from the configuration of the first embodiment is that a signal is input to the TV-AF signal processing unit 504. Relevant components will be described with reference to FIG. 12. Those portions that are the same as the constituent portions of the first embodiment illustrated in FIG. 4 are denoted using the same reference numerals as those reference numerals already used above, and detailed description will not be repeated.

The signal after interpolation by the image interpolation processing unit 501 is sent through the AF gate switch 503 to the TV-AF signal processing unit 504. In other words, the signal input from the AF gate switch 503 is a TV-AF signal that is free of the effect of defective pixel portions corresponding to the position of the focus state detection element. The TV-AF signal processing unit 504 obtains a value expressing the brightness of the image by processing of the TV-AF signal and outputs the information signal to the AF control unit 512. In this case, the role of the AF gate switch 503 is only to determine the AF area based on the above distance map. The ON/OFF operation for the AF gate switch 503 is executed according to the control signal from the AF control unit 512.

According to the second embodiment, information indicating the brightness of the image is obtained from the signal after pixel interpolation processing by the TV-AF control. Consequently, improved automatic focus adjustment performance is obtained also in relation to an image having a shallow depth of field by combination of a distance map obtained by phase difference detection using an imaging element.

While the embodiments of the present invention have been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2010-108599 filed May 10, 2010 which is hereby incorporated by reference herein in its entirety.

What is claimed is:

1. An imaging apparatus comprising:
   a focus state detection unit provided in an imaging element and detecting a phase difference;
   a signal processing unit for generating a focus adjustment signal based on the imaging signal outputted by the imaging element; and
   a control unit that acquires an in-focus lens position in accordance with a focus lens based on a focus deviation amount, the focus deviation amount calculated from a detection result of the focus state detection unit, calculates distance information related to the in-focus distance on the image screen, and controls the driving of the focus lens based on the distance information and the focus adjustment signal;
   wherein, when a difference between the in-focus lens position and the position of the focus lens at the current time exceeds a threshold, the control unit drives the focus lens to the in-focus lens position, and when the difference between the in-focus lens position and the position of the focus lens at the current time is less than or equal to the threshold, the control unit executes the in-focus control based on the focus adjustment signal,
   wherein the control unit sets a detection frame for executing the in-focus control based on the focus adjustment signal, the detection frame being set based on the distance information so that the proportion of the area within a predetermined depth of field is greater than the proportion of the area outside the predetermined depth of field, and
   wherein the focus adjustment signal is generated based on the imaging signal in the detection frame.

2. The imaging apparatus according to claim 1, wherein the control unit comprises:
   a phase-difference calculation processing unit for processing of a detection result from the focus state detection unit and calculates a focus deviation amount;
   a distance map generation processing unit that calculates the in-focus lens position based on the focus deviation amount, uses the in-focus lens position and the distance table to generate map information expressing a distribution of the in-focus distance in the imaging screen; and
   a focus adjustment control unit that sets the detection frame for the focus state detection according to the map information, and executes drive control of the focus lens.

3. The imaging apparatus according to claim 2, wherein the focus adjustment control unit searches the proximity of the in-focus point according to the map information, and shifts the focus lens to the in-focus point based on the focus adjustment signal.

4. The imaging apparatus according to claim 3, wherein the focus adjustment control unit compares a case when it is determined that another object is present in addition to the main object in the near-end depth of the depth of field with a case when it is determined that another object is not present, and reduces the drive amount of the focus lens in proximity to the in-focus point, the reduced drive amount being equal to or less than the drive amount when it is determined that another object is not present.

5. The imaging apparatus according to claim 1, wherein the signal processing unit generates the focus adjustment signal using the imaging signal for a pixel in a range that deletes horizontal lines that include the focus state detection unit in the imaging element.

6. The imaging apparatus according to claim 1, further comprising,
a pixel interpolation processing unit that calculates data corresponding to a position of the focus state detection unit by interpolation using the data for a pixel positioned in the periphery of the focus state detection unit in the imaging element,
wherein the signal processing unit generates the focus adjustment signal using the imaging signal obtained by interpolation of pixel by the pixel interpolation processing unit.

7. A method for controlling an imaging apparatus, the imaging apparatus including a focus state detection unit provided in an imaging element and detecting a phase difference, and a signal processing unit for generating a focus adjustment signal based on the imaging signal outputted by the imaging element, the method comprising the steps of:
acquiring an in-focus lens position in accordance with a focus lens based on a focus deviation amount calculated using a detection result from the focus state detection unit to calculate distance information related to the in-focus distance on the image screen;
driving the focus lens to the in-focus lens position when a difference between the in-focus lens position and the position of the focus lens at the current time exceeds a threshold, and executing in-focus control based on the focus adjustment signal when the difference between the in-focus lens position and the position of the focus lens at the current time is less than or equal to the threshold; and
setting a detection frame for executing in-focus control based on the focus adjustment signal, wherein the detection frame is set based on the distance information so that the proportion of the area within a predetermined depth of field is greater than the proportion of the area outside the predetermined depth of field;
wherein the focus adjustment signal is generated based on the imaging signal in the detection frame.

8. An imaging apparatus comprising:
a focus state detection unit which is configured to detect a focus state by phase difference method;
a signal processing unit which is configured to generate a focus adjustment signal based on an imaging signal outputted by an imaging element; and
a control unit which is configured to acquire an in-focus lens position in accordance with the focus state acquired by the focus state detection unit and the focus adjustment signal generated by the signal processing unit;
wherein the control unit sets a detection frame for generating the focus adjustment signal, the detection frame being set based on the focus state acquired by the focus state detection unit so that the proportion of a first area within a predetermined depth of field is greater than the proportion of an area other than the first area within the predetermined depth of field, and
wherein the focus adjustment signal is generated based on the imaging signal in the detection frame.

9. The imaging apparatus according to claim 8, wherein, when a difference between the in-focus lens position and the position of the focus lens at the current time exceeds a threshold, the control unit drives the focus lens to the in-focus lens position, and when the difference between the in-focus lens position and the position of the focus lens at the current time is less than or equal to the threshold, the control unit executes the in-focus control based on the focus adjustment signal.

10. The imaging apparatus according to claim 8, wherein the control unit comprises:
a phase-difference calculation processing unit which is configured to process a detection result from the focus state detection unit and calculate a focus deviation amount;
a distance map generation processing unit which is configured to calculate in focus distance of each the area based on the focus deviation amount.

11. The imaging apparatus according to claim 8, wherein the signal processing unit generates the focus adjustment signal using the imaging signal for a pixel in a range that deletes horizontal lines that include the focus state detection unit in the imaging element.

12. The imaging apparatus according to claim 8, further comprising, a pixel interpolation processing unit which is configured to calculate data corresponding to a position of the focus state detection unit by interpolation using the data for a pixel positioned in the periphery of the focus state detection unit in the imaging element.

13. The imaging apparatus according to claim 8, wherein the control unit sets a high number of areas having the same in focus distance as the first area and sets the detection frame on the basis of the in focus distance of the first area.

* * * * *